Jan. 12, 1937.                H. GOLDBERG                2,067,267
                            NUT TAPPING MACHINE
                    Filed May 29, 1933      9 Sheets-Sheet 1

Inventor:
Herman Goldberg
by Rector, Hibben, David & Macauley,
Attys.

Jan. 12, 1937.   H. GOLDBERG   2,067,267
NUT TAPPING MACHINE
Filed May 29, 1933   9 Sheets-Sheet 2

Inventor:
Herman Goldberg
by Rector, Hibben, Davis & Macauley,
attys

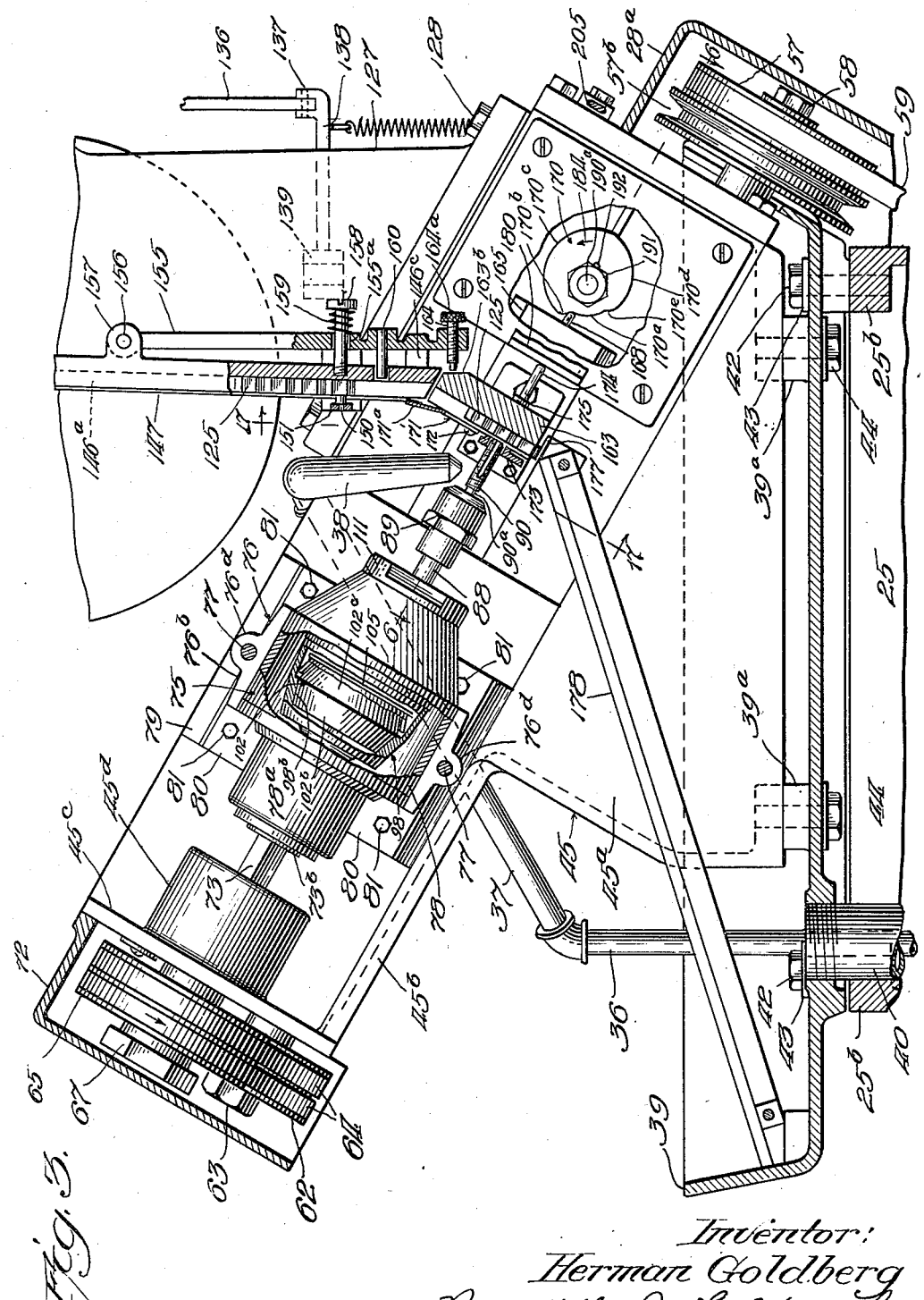

Jan. 12, 1937.  H. GOLDBERG  2,067,267
NUT TAPPING MACHINE
Filed May 29, 1933    9 Sheets-Sheet 4
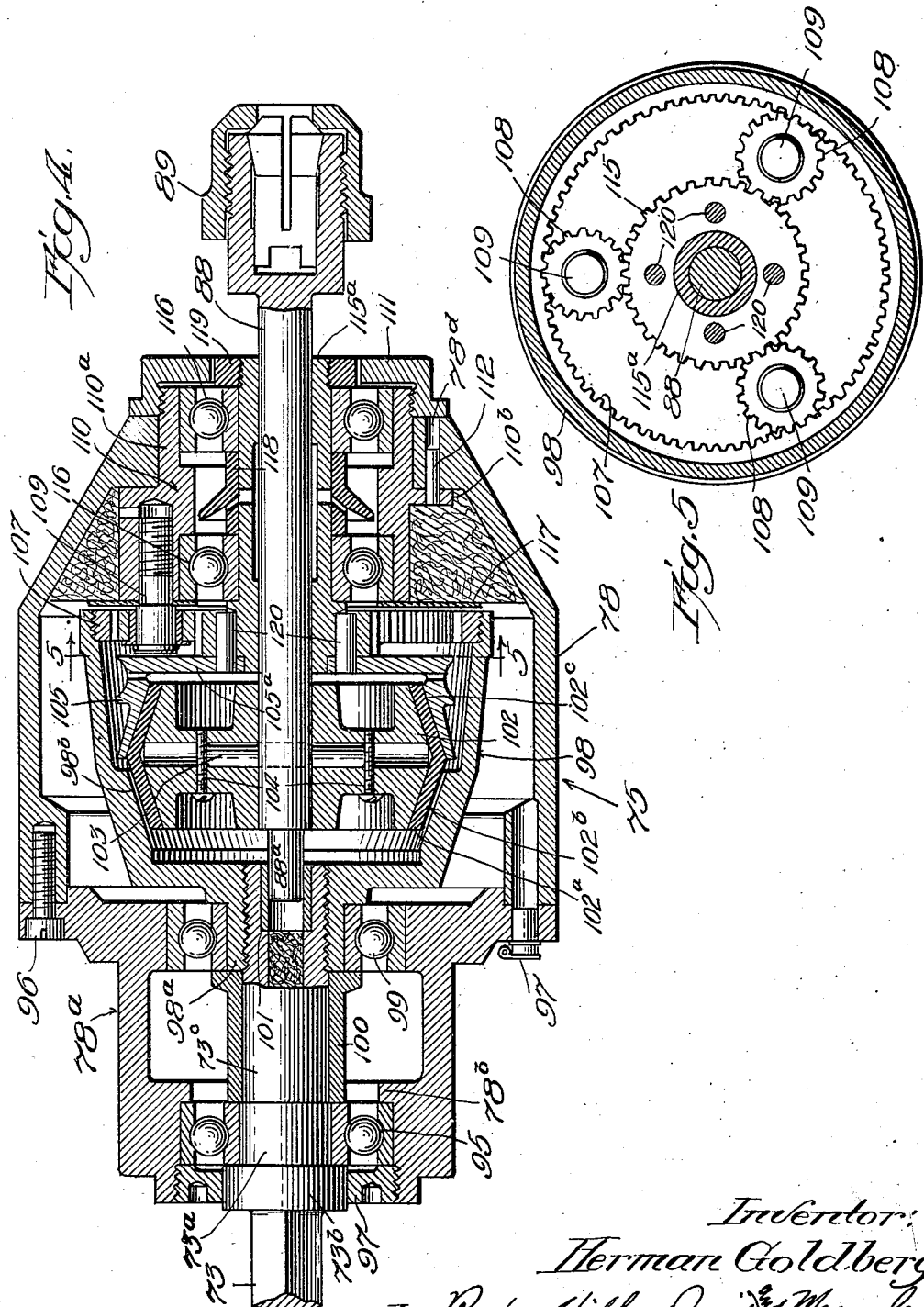
Inventor:
Herman Goldberg Jan. 12, 1937.  H. GOLDBERG  2,067,267
NUT TAPPING MACHINE
Filed May 29, 1933  9 Sheets-Sheet 5

Inventor:
Herman Goldberg
by Rector, Hibben, Davis & Macauley
Attys

Jan. 12, 1937.  H. GOLDBERG  2,067,267
NUT TAPPING MACHINE
Filed May 29, 1933  9 Sheets-Sheet 6
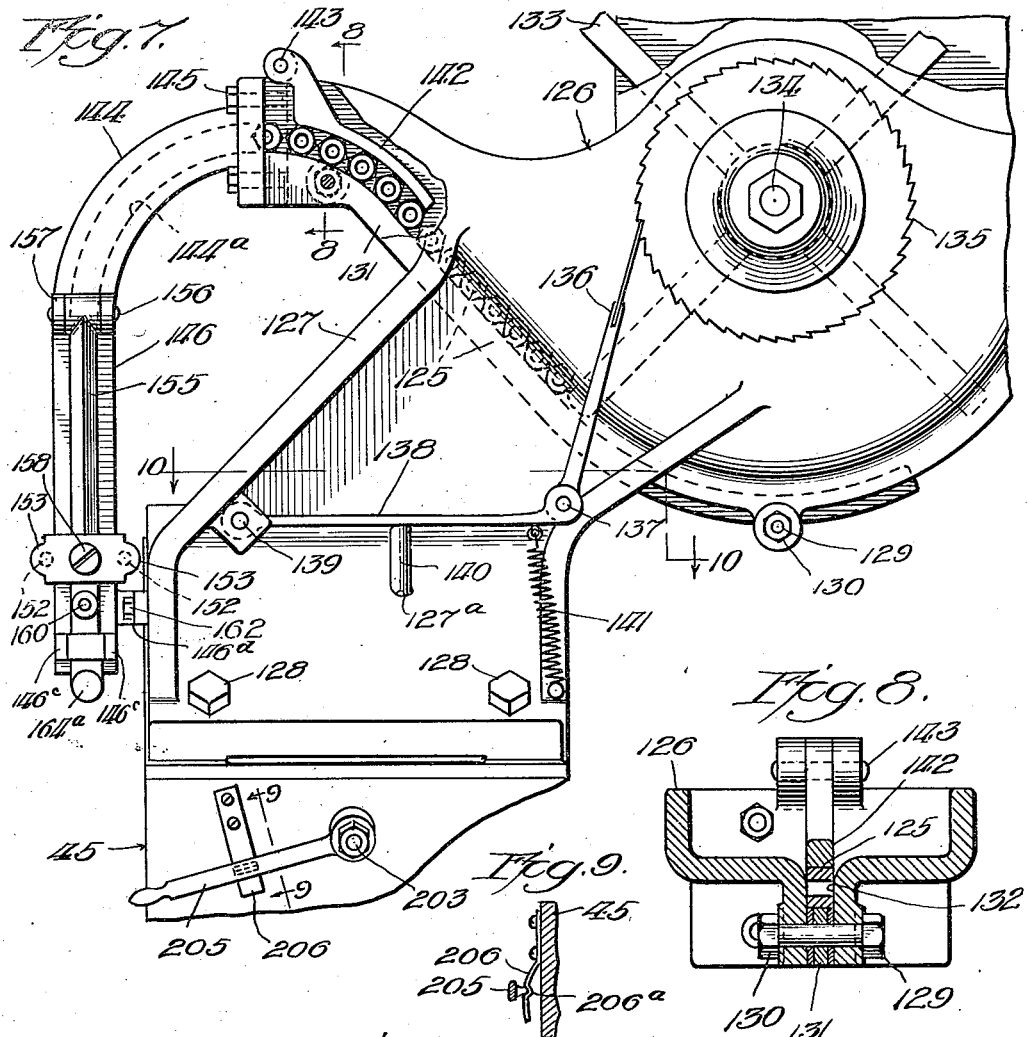
Inventor:
Herman Goldberg
by Rector, Hibben, Davis & Macauley
Attys

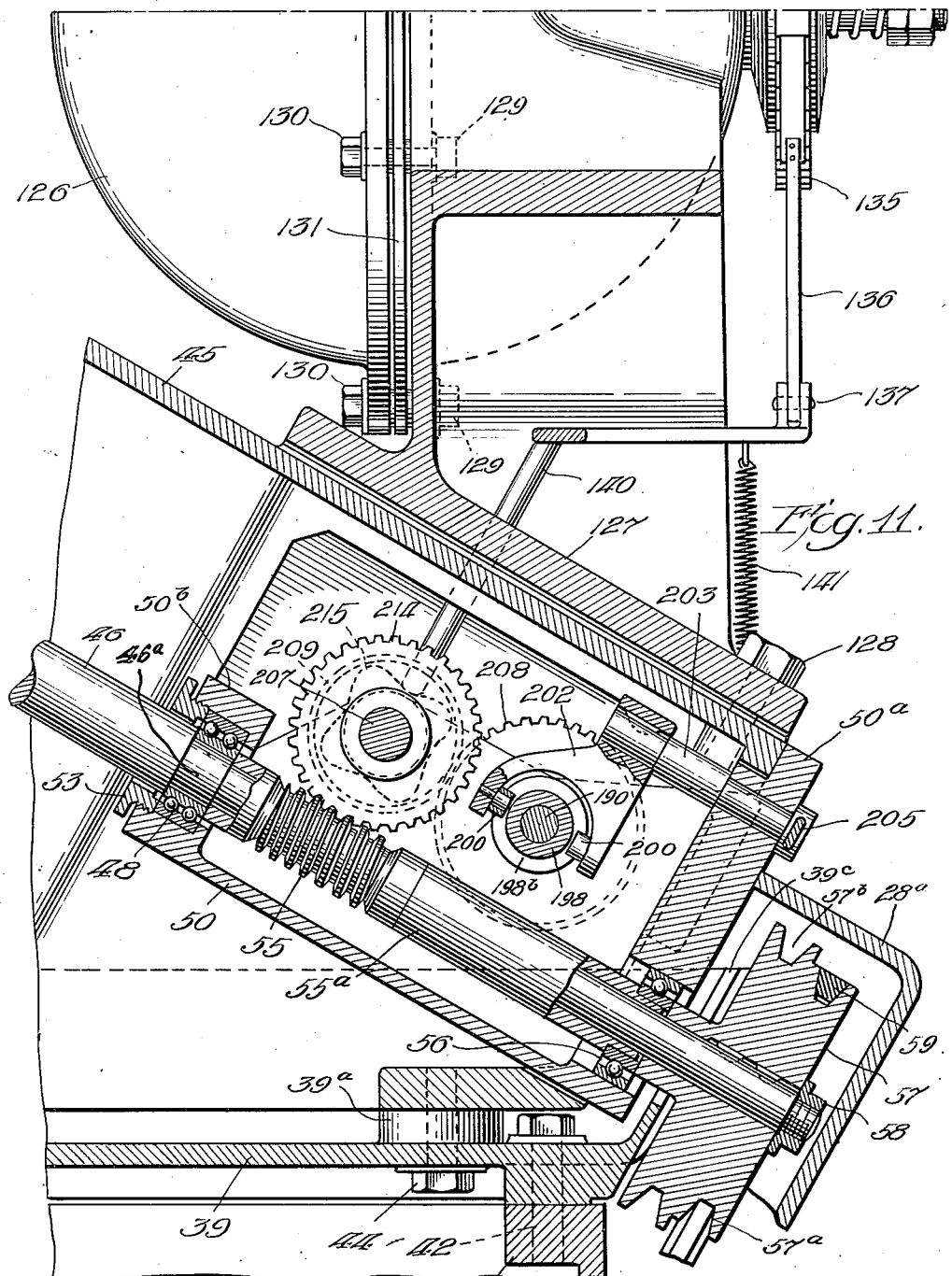

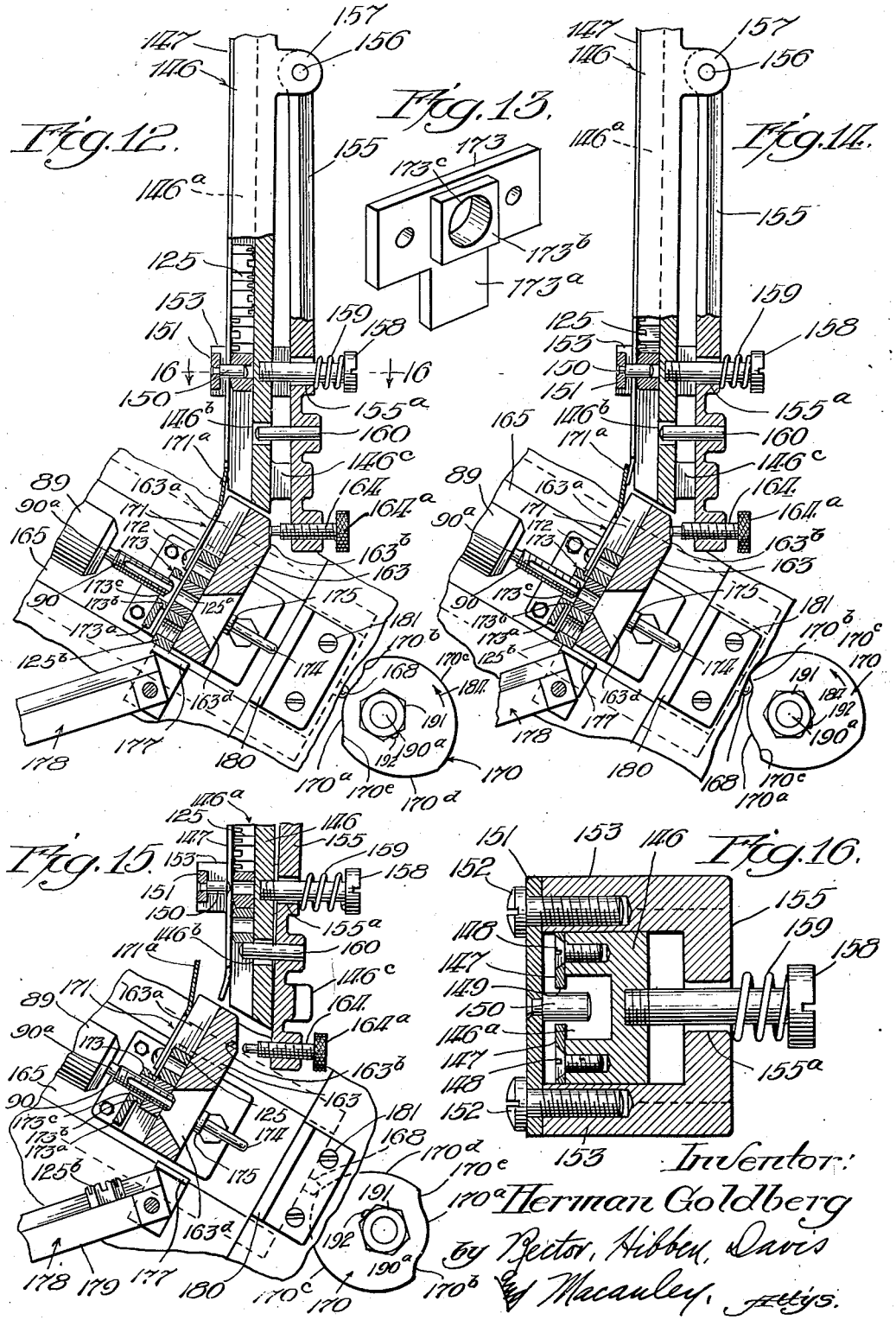

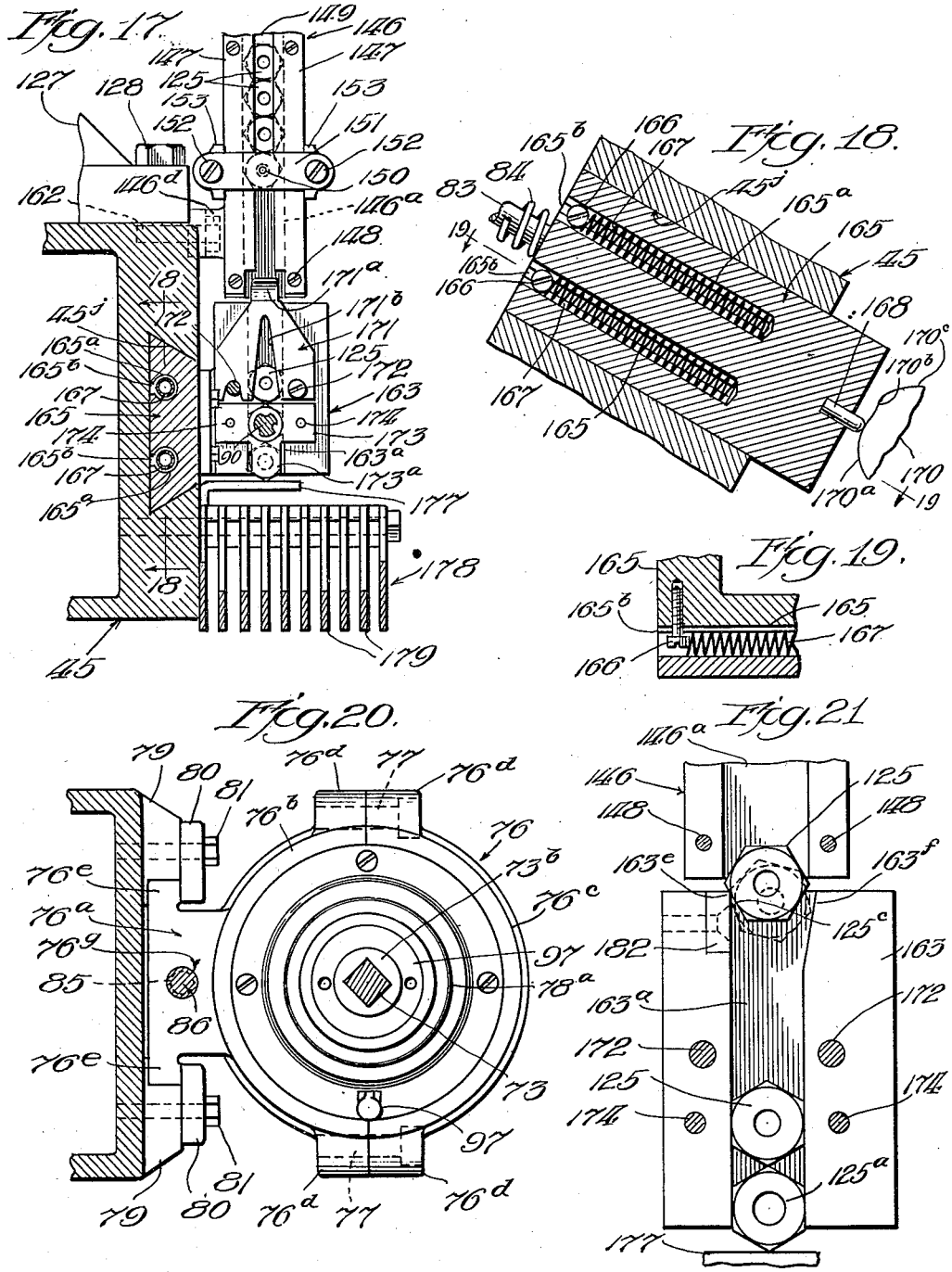

Patented Jan. 12, 1937

2,067,267

UNITED STATES PATENT OFFICE 2,067,267

NUT TAPPING MACHINE

Herman Goldberg, Chicago, Ill.

Application May 29, 1933, Serial No. 673,383

18 Claims. (Cl. 10—139)

This invention relates to improvements in nut tapping machines and its purpose is to provide an improved machine for tapping nut blanks more speedily and economically, and with a greater degree of accuracy, than has heretofore been possible. Except in the operation of forming threads in nuts of large size, where a considerable number of nuts are tapped successively and threaded onto a tap having a long shank, the commercial practice of tapping nuts has heretofore been carried on chiefly, if not entirely, in machines employing so-called bent shank taps which permit the nuts to be tapped successively and progressively moved over the bent shank of the tap until they are discharged from the free end of the shank, thus making it unnecessary to effect a relative reversal of the direction of movement of the nuts and the tap during the tapping operation. When tapping nuts with a tap having a long straight shank, as in the practice of tapping large nuts, it is necessary to shut down the machine when the shank of the tap is completely occupied with nuts which must then be removed, and when tapping nut blanks with a machine employing a bent shank tap, one of the most objectionable features is the impossibility of forming threads having a high degree of accuracy owing to the fact that the bent shank must necessarily be directly supported by the nuts themselves after they have been passed over the tap portion of the tool in order to permit the nuts to be discharged successively from the free end of the shank, thereby making it impossible to mount the tap with sufficient rigidity.

Under the classification prepared by the United States Bureau of Standards, nuts are classified as class 1, class 2, class 3 or class 4, according to the degree of accuracy with which the threads are formed therein, the nuts of the highest class being those having the most accurately formed threads. There was formerly no great demand for nuts having the highest degree of accuracy and there was no great difficulty in forming nuts of the class 1 or class 2 accuracy by the use of a tapping tool having a bent shank but there has more recently developed a great demand for nuts having the class 3 or class 4 degrees of accuracy, particularly for use in the construction of airplanes, automobile engines and other machines or devices subject to vibration and requiring the highest possible degree of accuracy in construction. There has been no commercial method of supplying this demand satisfactorily; in order to form nuts of the class 3 accuracy, it has been necessary to tap each nut blank twice by the bent shank method in order to remove, as far as possible, the inaccuracies remaining after a single pass of the nut over the tap, and there has been no method of producing on a commercial scale nuts having the class 4 accuracy which is now demanded in many lines of mechanical construction.

The principal object of the present invention is to provide an improved tapping machine by which nut blanks are tapped according to a new method employing a rigidly mounted tapping tool and requiring the relative reversal of the directions of movement of the nut and the tap after each tapping operation. A further object of the invention is to provide an improved nut tapping machine in which nut blanks may be tapped with greater speed than has heretofore been possible notwithstanding the fact that the tapping tool is reversed with respect to the nut and removed therefrom at the end of each tapping operation. Still another object of the invention is to provide an improved nut tapping machine comprising means for reversing the direction of rotation of the tap when the threads have been completely formed in the blank. A further object of the invention is to provide means for moving the nut blank in a predetermined manner during the operation of tapping in combination with means for automatically advancing the tap through the nut and then reversing the direction of rotation of the tap and the direction of movement of the nut when the tapping operation is completed. Another important feature of the invention is the provision of novel means for feeding the nut blanks to the position where they are tapped. A highly important object of the invention is to provide an improved tapping machine in which breakage of or injury to the tapping tool or any other part of the mechanism is prevented even though the machine continues to operate after the nut blanks have become jammed in their passage to the tapping position and even though a blank may not be properly lined up to be tapped, difficulties which have heretofore given rise to the inevitable breakage of the tap. A still further object of the invention is to provide an improved tapping machine which may be readily adapted to the purpose of tapping nut blanks of widely varying sizes. A further object of the invention is to provide a tapping machine having a novel form of chuck for holding the nut during the tapping operation in combination with means for moving this chuck along the axis of the tap during the operation of tapping. Another object of the invention is to provide an improved method of tapping nuts. Other objects relate to various features of construction and arrangement of the machine and of the improved method of tapping which will appear more fully hereinafter.

The nature of the invention will be understood from the following specification taken with the accompanying drawings, in which Fig. 1 shows a side elevation of a nut tapping machine embodying the features of the present invention;

Fig. 3 shows a vertical section taken on the line 3—3 of Fig. 2;

Fig. 4 shows an enlarged axial section taken through the driving head by which motion is transmitted from the driving head to the tap and by which the direction of rotation of the tap is automatically reversed at predetermined points in the operation of tapping;

Fig. 5 shows a transverse section taken on the line 5—5 of Fig. 4;

Fig. 7 shows an enlarged end elevation of the upper end portion of the machine, illustrating the nut blank supply hopper and the means for feeding nut blanks therefrom;

Fig. 8 is an enlarged detail section taken on the line 8—8 of Fig. 7;

Fig. 9 shows an enlarged detail section taken on the line 9—9 of Fig. 7;

Fig. 10 shows a section taken on the line 10—10 of Fig. 7;

Fig. 11 is an enlarged vertical section taken on the line 11—11 of Fig. 2, illustrating the means for driving the cam shaft and actuating the nut blank supply hopper;

Figure 2:
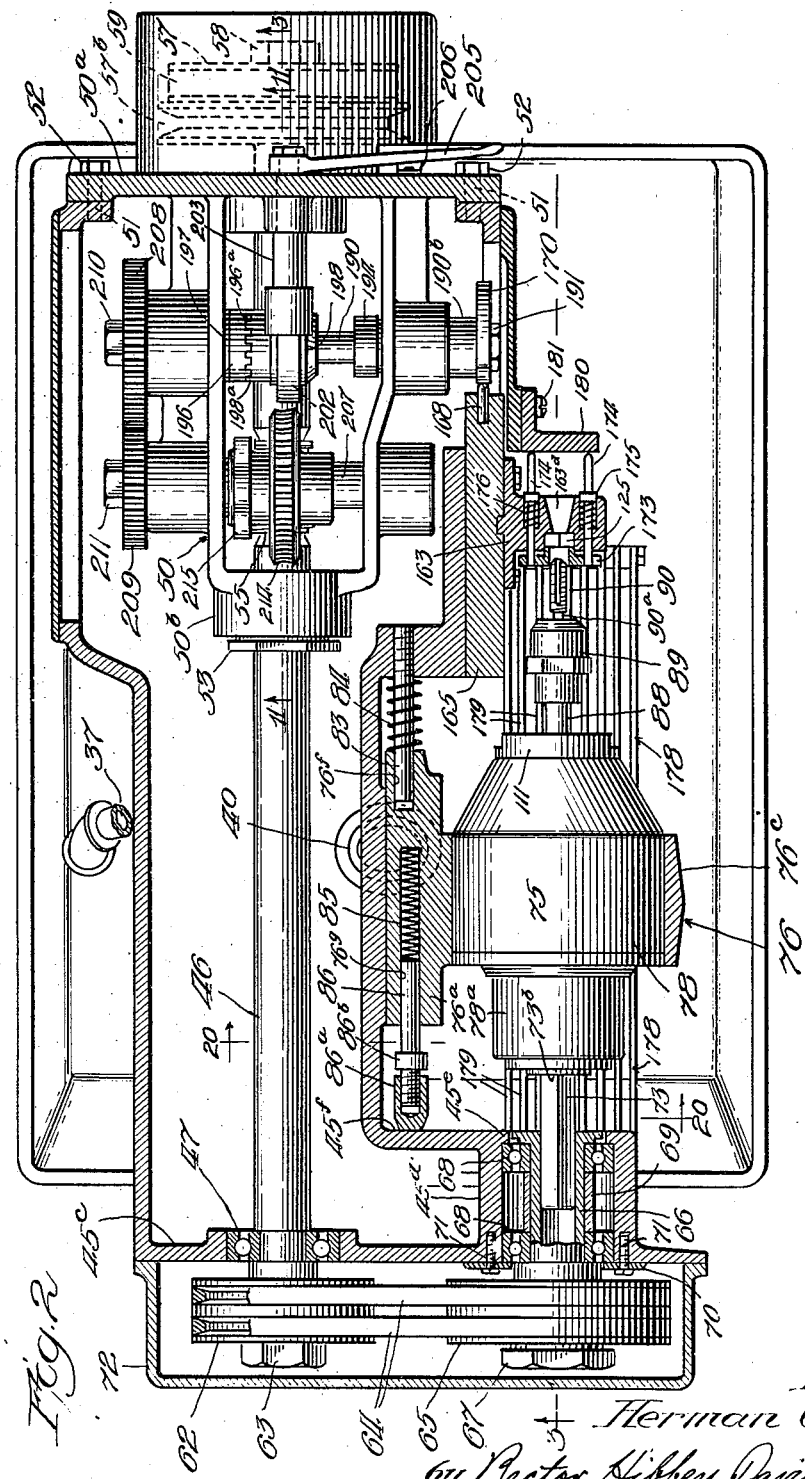
Fig. 2 shows an enlarged section taken on the line 2—2 of Fig. 1.

Fig. 12 shows an enlarged side elevation of the guide for feeding the nut blanks and of the chuck by which they are held during the tapping operation together with the cam by which the chuck is advanced longitudinally of the axis of the tap during the tapping operations, portions of the guide and other parts being broken away, the relative positions of the parts being such as they occupy immediately after a nut blank is dropped into position within the chuck but before the nut blank is clamped in the chuck;

Fig. 13 is a perspective view of the clamping plate by which the nut blank is held in the chuck during the nut tapping operation;

Fig. 14 is a view similar to that of Fig. 12, showing the relative positions of the parts at a later period of the operation when the clamping plate is moved into position to hold the nut blank in the chuck and showing the cam about to cause the chuck and the nut blank to be moved toward the tap;

Fig. 15 is a view similar to the lower portions of Figs. 12 and 14 showing the relative positions of the parts after a relative movement of the chuck and the tap has taken place to the point where the threads have been completely formed in the nut by the tap;

Fig. 16 shows an enlarged section taken on the line 16—16 of Fig. 12;

Fig. 17 is a vertical section taken on the line 17—17 of Fig. 3, illustrating an end elevation of the chuck and the nut feeding guide;

Fig. 18 is an enlarged vertical section taken on the line 18—18 of Fig. 17;

Fig. 19 shows an enlarged detail section taken on the line 19—19 of Fig. 18;

Fig. 20 shows a transverse section taken on the line 20—20 of Fig. 2; and

Fig. 21 is an enlarged front elevation of the lower part of the nut guide and of the nut chuck with the clamping plate and other parts removed, showing the means for turning the nut blanks as they pass into the chuck.

As illustrated in the drawings, the invention comprises a hollow pedestal or base 25 having an outwardly extending lower flange 25ª which is adapted to rest upon and be secured to a floor or other support. The pedestal is provided with a front door 26 mounted on hinges 27 and having ventilating openings 26ª therein. An end door 28 is also provided at one end of the casing and at the other end there is a motor starter and controller 29 which is connected in the electric circuit of an electric motor 30 in the casing for driving the various parts of the mechanism. The shaft 30ª of this motor is provided with a pulley 31 connected by a belt 32 with another pulley 33 mounted on the shaft of a pump 34 which is adapted to effect the circulation of a cooling fluid, such as oil or the like, which is stored in the reservoir formed by the lower part of the interior chamber of the base. This solution is elevated by the pump through an inlet pipe 35 and is discharged through an outlet pipe 36 having a branch 37 which leads to the nozzle 38 by which the fluid is discharged upon the tap at the point where it engages the nut blank during the operation of tapping. The solution thus discharged drips down into a pan 39 and returns from the pan through a drain pipe 40 to the storage chamber in the lower part of the base. The pan 39 is secured to the pedestal 25 by means of studs 42 which engage bosses 25ᵇ formed at the upper end of the base and which have washers 43 mounted beneath their heads to form fluid-tight joints in the bottom wall of the pan.

This lower wall of the pan 39 is provided with upwardly extending bosses 39ª through which pass studs 44 by which the housing 45 is secured in place above the pan. The bosses 39ª are located substantially midway between the sides of the pan, thus locating the housing 45 in an intermediate position. The housing comprises a vertically extending supporting plate 45ª of substantially triangular form having united integrally therewith the longitudinal hollow body portion 45ᵇ which extends at an angle of substantially thirty degrees to the horizontal and which supports the principal parts of the mechanism by which the tapping of the nuts is effected. This body portion of the housing is provided at its upper end with an end wall 45ᶜ provided with an opening in which the main driving shaft 46 is journaled through an intermediate ball bearing unit 47, as shown particularly in Fig. 2. The lower portion of this main driving shaft 46 is reduced in diameter as shown at 46ª in Fig. 11, and a shoulder at the upper end of this reduced portion engages a ball bearing unit 48 carried by a frame 50 which comprises an end plate 50ª detachably secured over the open lower end of the housing 45 by means of bolts 51 and nuts 52, as illustrated in Fig. 2. The ball bearing unit 48 is mounted in a recess formed in a boss 50ᵇ extending upwardly from the lower part of the frame 50 and this unit is held in place by a nut or gland 53 which threadedly engages the upper end of the recess, as shown in Fig. 11. A worm 55 and a spacing sleeve 55ª are secured on the reduced portion 46ª of the driving shaft below the bearing 48 and the lower part of this sleeve is journaled in an opening formed in the end plate of the frame 50 by means of a ball bearing unit 56.

Figure 1:
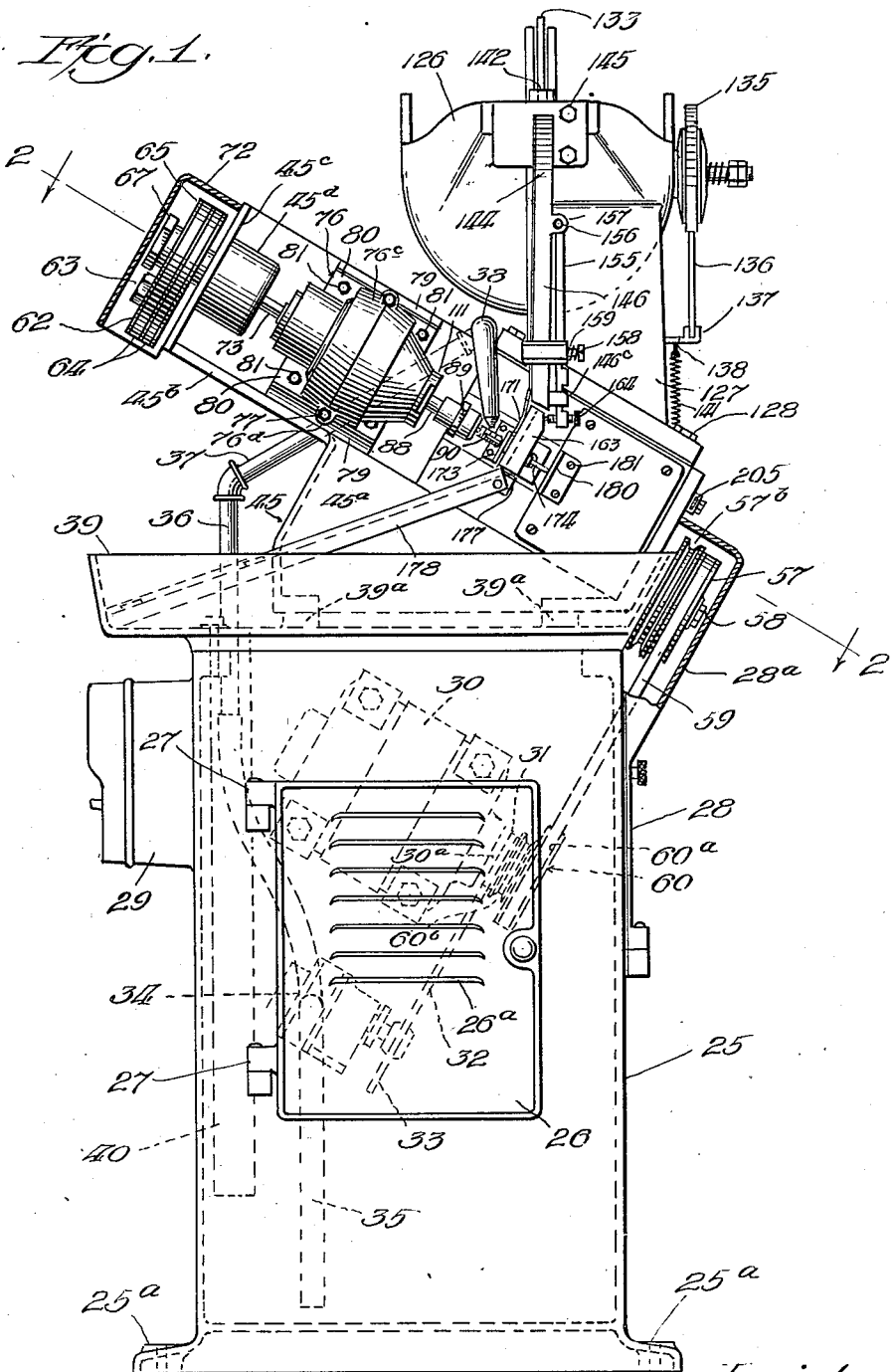

The reduced portion 46ª of the driving shaft projects outwardly beyond the end plate 50ª of the frame and has secured thereon a double grooved pulley 57 which is splined on the shaft and held against endwise movement by means of a nut 58 engaging the threaded end of the shaft. The hub of this pulley extends through a slot 39ᶜ formed in the end of the pan 39 and seats against the ball bearing unit 56, as shown in Fig. 11. The pulley 57 is provided with two grooves 57ª and 57ᵇ, of different diameters, one of which is engaged by a driving belt 59 which extends downwardly through an opening in the end wall of the pedestal or base 25 and then around another double grooved pulley 60 which is secured upon the shaft 30ª of the driving motor. This pulley 60 has two grooves 60ª and 60ᵇ of different diameters so that the belt 59 may be shifted from one set of grooves in the two pulleys to the other set of grooves therein for the purpose of varying the speed with which the main driving shaft 46 is driven. Of course, these pulleys 57 and 60 may be interchanged with other pulleys of different sizes for obtaining still other variations in speed and, with any arangement of pulleys, a considerable range of speed may be obtained by varying the speed of the driving motor 30. The end door 28 has an inclined extension 28ª which extends upwardly and forms a cover plate for the upper part of the belt 59 and the pulley 57, as shown in Fig. 1.

In addition to actuating the nut feeding means and the means for moving the nut holding chuck longitudinally of the tap, the main driving shaft 46 serves to actuate the mechanism by which the tap is rotated and its direction of rotation automatically reversed at predetermined points in the operation of tapping. This tap driving mechanism is actuated from the upper end of the shaft 46 through a pulley 62 which is splined on the end of the shaft and detachably held against longitudinal movement by a nut 63, as shown in Figs. 1 and 2. The pulley 62 is provided with a pair of grooves of equal diameter which are engaged by the belts 64 which also engage the grooves in a pulley 65 splined on the end of a hollow tap driving spindle 66 on which it is held against endwise movement by a nut 67. The spindle 66 is journaled in a pair of ball bearing units 68 which are secured within a hub 45ᵈ formed as a part of the housing 45. The inner bearing unit seats against an annular shoulder 45ᵉ formed at the end of this hub and the two bearing units are spaced apart by a sleeve 69. A retaining ring 70 engages the outer end of the outer bearing unit 68 and is detachably held in place by screws 71. The operator is protected from accidental contact with the belt 64 and moving pulleys by a pulley cover 72 which is detachably secured to the end wall 45ᶜ of the housing.

The spindle 66 has a bore of square or other non-circular cross-section with which the shaft 73, a similar cross-section, has a sliding driving fit. This shaft actuates the power transmitting mechanism of the tap head 75 by which the tap is rotated in either direction. The tap head 75 is carried by a holder 76, as shown particularly in Figs. 2 and 20, and this holder comprises a block 76ª arranged to support a circular strap comprising the semicircular section 76ᵇ, formed integrally with the block 76ª, and a separable semicircular section 76ᶜ which is detachably secured to the section 76ᵇ by means of cap screws 77 engaging the bosses 76ᵈ which project from the ends of the strap sections. This circular strap of the holder is adapted to extend around the central cylindrical portion of the casing 78 of the tap head and when the cap screws 77 are tightened, the tap head is thus held securely in position. The block 76ª of the holder is adapted to slide longitudinally of the housing 45 in a guideway which is formed by a pair of guide blocks 79 having plates 80 seated thereon to overlap the flanges 76ᵉ of the holder block.

The blocks 79 and the plates 80 are secured to the wall of the housing by means of cap screws 81. At the end removed from the shaft 73, the block 76ª of the holder is provided with a cylindrical recess 76ᶠ which is slidably engaged by a pin 83 having its other end threaded and fixed in the adjacent transverse shoulder of the housing. A heavy coil spring 84 is mounted on this pin between the shoulder and the end of the holder to serve as a slightly yielding stop for the holder when it is returned to its extreme right-hand position, as illustrated in Figs. 1 and 2. The holder 76 is normally forced against the stop spring 84 by means of a coil spring 85 and a pin 86 which are mounted in another cylindrical recess 76ᵍ formed in the block 76ª of the holder at the end thereof opposite the pin 83, as shown in Fig. 2. The pin 86 slidably engages this recess and is threaded at its outer end for engagement by an adjustable head 86ª which is adapted to coact with the adjacent transverse shoulder 45ᶠ of the housing. A collar 86ᵇ is mounted on the pin to limit its inward movement when the spring 85 is compressed under the influence of the forces transmitted to the tap head 75, as hereinafter described.

The mechanism of the tap head 75 serves to rotate the tap spindle 88 which projects from the casing 78 in axial alignment with the shaft 73 and which carries a chuck 89 in which the tap 90 is detachably secured. This tap may be of the usual form employed in the tapping of nuts except that it has a relatively short shank 90ª and is therefore mounted in close proximity to the chuck 89 by which it is held. The chuck 89 may be of any usual form, comprising an outer rotatable nut which may be tightened to compress the parts of the chuck between which the shank of the tap is clamped. The mechanism of the tap contained within the housing 78 of the tap head 75 may be of any suitable form adapted for rotating the tap 90 in a direction to form threads in the nut blank when this blank is thrust toward the left, as shown in Fig. 2, against the tap, and to rotate the tap in the reverse direction when, at the completion of the operation of tapping the nut blank, the tapped nut and the chuck by which it is held begin their movement in the opposite direction.

As illustrated in the accompanying drawings, and particularly in Figs. 4 and 5 thereof, the tap head 75 comprises power transmitting mechanism including a friction clutch which is adapted to rotate the tap spindle 88 in the proper directions at predetermined times in the operation of the machine. As there shown, the shaft 73 is provided with a cylindrical portion 73ª which is journaled in a ball bearing unit 95 mounted in the detachable head portion 78ª of the tap head casing. This part 78ª is secured to the body portion of the casing by cap screws 96. An oiling device 97 may be mounted in the lower part of the casing. The portion 78ª of the casing is provided with a tubular bore in which the ball bearing unit 95 is mounted against an annular shoulder 78ᵇ and this bearing unit is held in place by a ring nut 97 which threadedly engages the outer end of the bore. The shaft has an enlarged portion 73ᵇ adjacent the bearing which rotates within the nut. The inner end portion 73ᶜ of the shaft 73 is of lesser diameter than the part 73ᵃ and is externally threaded at its inner end for engagement with the internally threaded hub portion 98ᵃ of the outer driving shell 98 which rotates within the body portion of the tap head casing. The hub portion 98ᵃ of this shell revolves within a ball bearing unit 99 which fits within a portion of the bore of the casing head 78ᵃ and which is held in place against the end shoulder of the shell by means of a spacing sleeve 100 mounted on the part 73ᶜ of the shaft. This inner end of the shaft 73ᶜ is provided with an internal bore in which a hard metal bearing sleeve 101 is mounted to receive the reduced extremity 88ᵃ of the tap spindle which is mounted to revolve within the casing 78, as hereinafter described.

The driving shell 98 is provided adjacent the hub portion thereof with an annular tapered frictional driving surface 98ᵇ which is adapted to coact with one annular tapered driving surface 102ᵇ of a friction clutch member 102 which is fixed on the inner end of the spindle 88 by means of a transverse pin 103. This pin 103 is held in place by two screws 104. In addition to the surface 102ᵇ which is adapted to coact with the surface 98ᵇ of the driving shell when the spindle 88 is rotated in a direction adapted to effect the tapping of a nut blank, the clutch member 102 has an additional annular tapered driving surface 102ᶜ which is inclined in the opposite direction to the surface 102ᵇ and which is adapted to coact with the internal annular tapered surface of the reverse driving shell 105 when it is desired to effect the reverse rotation of the spindle 88 for the purpose of withdrawing the tap from the threaded nut.

The extreme outer end of the driving shell 98 is internally threaded for engagement by an internal ring gear 107 which rotates with the shell and which has its teeth arranged to mesh with a series of idler pinions 108 which are mounted to revolve on studs 109 mounted in the stationary idler pinion block 110. This pinion block has a portion 110ᵃ of reduced diameter which fits within the bore formed at the lowermost tapered end of the casing 78 and the outer end of this reduced portion is externally threaded for engagement by a nut 111 which holds the block against endwise movement. The block is held against rotation by a pin 112 which engages the annular flange 110ᵇ of the block and enters a hole 78ᵈ formed in the end portion of the casing. The pinions 108 are arranged to mesh with the reverse gear 115 which has an elongated hub 115ᵃ provided with a bore in which the spindle 88 rotates, and mounted for rotation about the spindle in a pair of ball bearing units 116 which are mounted within the bore of the pinion block 110. The innermost ball bearing seats against a shoulder of the pinion block and is held in place by the retaining plate 117 which is secured to the block and the outer ball bearing unit 116 is spaced from the inner one by the annular spacer 118 provided with an annular tapered flange beneath which are located oil holes for conveying lubricant to the communicating holes in the hub of the reverse gear through which it flows to the spindle 88. The outer threaded end of the hub 115ᵃ of the reverse gear is engaged by a ring nut 119 which holds the outer ball bearing unit against the spacer 118. The reverse gear 115 is secured to the radial disk 105ᵃ of the reverse driving shell 105 by a series of pins 120 so that the reverse gear and the reverse shell rotate together. When the parts are in the relative positions shown in Fig. 4, with the clutch member 102 disengaged from the driving surface 98ᵇ of the outer driving shell, and with the reverse driving shell 105 engaging the annular driving surface 102ᶜ of the clutch member, the rotation of the driving shell 98 operates through the pinions 108 and the reverse gear 115 to effect the rotation of the inner driving shell 105 in a direction opposite to the direction of rotation of the outer driving shell 98, and this reverse rotation is imparted to the clutch member 102 through the coacting friction surface of the clutch member and the inner driving shell, so that the spindle 88 is then rotated in a reverse direction, adapted to withdraw the tap 90 from the threaded nut. When the spindle 88 is thrust endwise toward the left, as viewed in Figs. 1, 2 and 4, the clutch member 102 is disengaged from the reverse driving shell 105 and is moved into engagement with the surface 98ᵇ of the outer driving shell so that a direct drive is then established between the outer driving shell and the spindle 88 through the clutch member 102, thus causing the spindle 88 to rotate in a direction adapted to effect the tapping of the nut blank by the tap 90.

Having described the means for rotating the tap 90 in either direction, the means for feeding the nut blanks to the place where they are engaged by the rotating tap will now be referred to. These nut blanks 125, which are of the same form as the completed nut except that they are not internally threaded, are contained in a hopper 126 carried by a bracket 127 which is secured to the upper side of the housing 45 by means of cap screws 128, as shown particularly in Figs. 1, 7 and 11. The upper portion of the hopper 126 is formed in two half sections which are secured together by bolts 129 and nuts 130. A spacer 131 is mounted between the lower depending flanges of these hopper parts, as shown in Fig. 8, thus forming a channel 132 along which a series of nut blanks are adapted to be moved in an upward inclined direction by the action of a number of feeding arms 133 carried by a hub which revolves about a shaft 134 journaled in the wall of the hopper. A ratchet wheel 135 is secured on the shaft 134 and is adapted to be operated by a pawl 136 which is pivoted at 137 upon a feed arm 138 of angular form, as shown in Figs. 7 and 10. This feed arm is pivoted at 139 upon the bracket 127 and is oscillated vertically by means of a plunger 140 which is slidably mounted in an aperture 127ᵃ formed in the bracket and which is operated by a cam, as hereinafter described. A coil spring 141 is connected to the bracket 127 and to the outer end of the arm 138 so that the arm is normally maintained in contact with the upper end of the plunger 140. With each upward movement of the plunger 140, the pawl 136 which leans against the teeth of the ratchet wheel under the influence of gravity is elevated so that the shaft 134 is gradually rotated and the outer ends of the feeding arms 133 are caused to move through the feed channel 132. The nut blanks are thus moved upwardly along this channel, as shown in Fig. 7, until they occupy a position adjacent the upper curved extremity of this channel where they are held against reverse movement by a retaining member 142 which is pivoted at 143 above the uppermost part of the channel and which has a curved portion overlying the nuts which are in the upper part of the channel. In case the channel and the guide into which the nut blanks are moved therefrom are completely occupied with nut blanks when the column of nuts is engaged by an end of one of the arms 133, the retaining member 142 may swing upwardly to permit some of the nut blanks to be projected from the channel for the purpose of relieving the compression.

As the nut blanks are discharged from the channel 132 of the hopper, they fall by gravity through the passage 144a of a curved track member 144 which is secured to the upper portion of the hopper by means of cap screws 145. The passage of this track member 144 communicates with the channel of a vertical guide 146 which is supported by the track member 144, as shown particularly in Figs. 7, 12 and 17. The guide member 146 has a channel 146a therein through which the nut blanks 125 move and a pair of metal strips or plates 147 are secured to the opposite sides of the body portion of this guide member by screws 148 so that they overlap the channel and retain the nuts therein during their downward movement while leaving a slot 149 between the plates, as illustrated in Fig. 17. Before being allowed to drop through the channel 146a into the chuck in which the nut blanks are held during the tapping operation, a series of nut blanks are supported temporarily in the channel 146a by means of a retaining pin 150 which is carried by a plate 151 extending transversely in front of the guide, as shown in Figs. 12 and 17, and having its ends secured by screws 152 to arms 153 which extend forwardly on opposite sides of the guide from a trip lever 155 by which they are carried. This trip lever is pivoted at 156 between ears 157 formed on the guide and it extends downwardly therefrom, being provided with an aperture 155a at a point opposite the pin 150, for engagement by a screw 158 which is mounted in a threaded recess in the wall of the guide 146 and which has a coil spring 159 mounted between its head and the rear side of the trip lever so that it normally tends to force the trip lever from the position shown in Fig. 12 to the position shown in Fig. 15.

The trip lever 155 carries a relatively fixed pin 160 which enters an aperture 146b in the rear wall of the guide 146 and which is adapted to enter the guideway 146a to support the column of nuts when the trip lever is in the position shown in Fig. 15. The lower portion of the trip lever is guided by a pair of lugs 146c which project rearwardly from the guide member 146 on opposite sides of the lever. The guide member, which is secured at its upper end to the track member 144, is supported at its lower end by means of a lug 146d which is formed thereon and connected by a stud 162 with the adjacent part of the hopper bracket 127. The feed member 146 is thus detachably mounted and is thus adapted to discharge nuts intermittently into the channel 163a of the nut holding chuck 163 which is mounted beneath the lower end of the feed member and adapted to reciprocate along the axis of rotation of the tap 90. The lower end of the trip lever 155 is threadedly engaged by a stop member 164 having a knurled head 164a by which it may be adjusted so that its point will engage the vertical surface 163b of the chuck at the proper instant in the travel of the chuck. When the trip lever is moved to its forward position, as shown in Fig. 15, the column of nuts is supported by the pin 160 and the pin 150 is withdrawn from its engagement with the nuts. When the chuck 163 moves downwardly along its guide, as hereinafter more fully explained, the surface 163b thereof engages the actuating pin 164 and moves the trip lever 155 to the position shown in Fig. 12, thereby causing the lowermost nut blank in the guideway 146a to be released while the nut next above is engaged and held by the pin 150 as the trip lever moves rearwardly under the influence of the spring 159. The column of nuts is then supported by the pin 150 while the nut which previously rested upon the pin 160 falls by gravity into the channel 163a of the chuck.

As shown particularly in Figs. 17, 18 and 19, the nut chuck 163 is carried by a supporting bar 165 which is slidably mounted in an undercut groove 45j formed in a vertically extending portion of the housing 45. The axis of this guideway 45j extends parallel to the axis of rotation of the tap 90. The sliding bar 165 is provided with two parallel recesses 165a and these recesses are open along the inner side of the bar through slots 165b, thus permitting a pair of stop screws 166 to be threaded into the housing with their heads occupying the recesses 165a and their stems engaging the slots 165b. A coil spring 167 is mounted in each recess between the heads of the screws 166 and the opposite end of the recess. These springs normally tend to force the sliding bar 165 and the supported nut chuck 163 in a downward direction along the inclined guideway, thereby maintaining a pin 168, secured in the lower end face of the bar, in contact with the peripheral surface of the cam 170 by which the nut chuck is actuated, as hereinafter described, for advancing the nut toward the tap head during the operation of tapping and for withdrawing the nut from the tap when the tapping operation has been completed.

Figure 6:
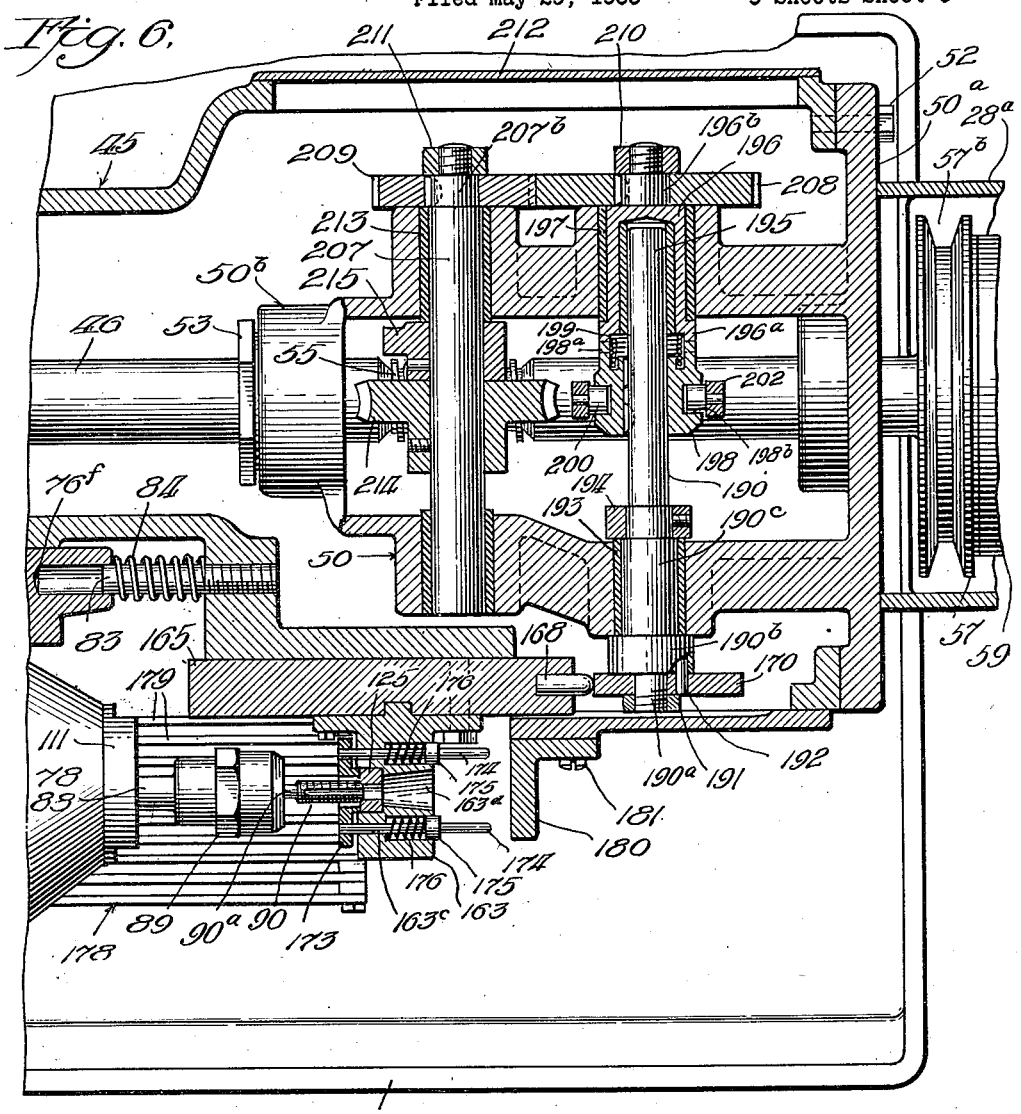
Fig. 6 shows an enlarged section taken on the line 6—6 of Fig. 3.

The nut chuck 163 comprises a metal block having formed therein the previously described channel 163a. The upper portion of the guide channel 163a in the nut chuck is partially closed by a retaining plate 171 which is secured to the block of the chuck by screws 172, as shown particularly in Fig. 17. This retaining plate has a tongue 171a which extends upwardly in front of the lower end of the guide channel 146a in the stationary guide 146, and it has a triangular slot 171b formed in the lower part thereof to permit access to the nut blanks 125, if desired, before they reach the tapping position behind the locking plate 173 which is mounted on the lower part of the chuck and which has the form shown particularly in Figs. 12, 13 and 17. The locking plate comprises a downwardly extending flange 173a which overlies the lower portion of the channel 163a, and it has a pair of laterally extending arms which have guide pins 174 fixed therein. These guide pins are adapted to slide in apertures 163c which are formed in the nut chuck, as shown in Fig. 6. Each guide pin 174 has a collar 175 fixed thereon and a coil spring 176 is mounted between this collar and the inner end of a tubular recess through which the pin moves. These springs thus tend to move the pins 174 in a downward direction, or toward the right as viewed in Figs. 6 and 12, thus tending to move the locking plate 173 into engagement with the nut blank to be tapped. The nut blank which is thus clamped in position is held by the central part of the locking plate which is provided on its inner side with an auxiliary block 173b, shown particularly in Fig. 13.

This block is adapted to enter the channel 163ᵃ in the chuck and engage a nut blank with sufficient pressure, under the influence of the coil springs 176, to hold the blank securely in place while it is being tapped. The locking plate is provided with an aperture 173ᶜ which is concentric with the axis of the tap 90 and of sufficient size to permit taps of various dimensions to pass therethrough during the operation of tapping the nuts. The nut chuck is provided with a flaring aperture 163ᵈ in alignment with the aperture 173ᶜ for engagement by the extremity of the tap at the completion of the tapping operation. Immediately beneath the nut chuck 163, there is mounted a nut stop bracket 177, shown in Figs. 12, 14, 15 and 17, which is secured to the side of the housing and which projects beneath the chuck in such a manner that it engages a tapped nut 125ᵇ and supports it in the channel 163ᵃ of the chuck, thereby employing this tapped nut as a spacer to position properly the untapped nut blank 125ᵃ which is positioned in axial alignment with the tap 90 during the operation of tapping. As the tapping of a new blank is completed and the nut chuck approaches the upper limit of its travel along its inclined guideway, a point is reached where the previously tapped spacing nut is discharged over the edge of the stop bracket 177, as shown in Fig. 15. This tapped nut then moves by gravity down the slide 178 which is mounted in an inclined position above the pan 39 and which is preferably made up of a number of spaced bars 179 which provide an opening between them for the escape of oil or other cooling fluid, discharged onto the nuts during the operation of tapping. After the blank 125ᵃ has been tapped and the nut chuck 163 moves away from the tap under the influence of the springs 167, a point is reached where the pins 174 engage a stop plate 180 attached to the side of the housing by screws 181. This engagement causes the pins to move the locking plate 173 away from the chuck 163 as the springs 176 are compressed, thereby releasing the nut which has just been tapped and allowing it to fall to a position on the stop bracket 177 which again occupies a position beneath the chuck when the release of the tapped nut occurs.

In order to insure an uninterrupted feeding of the nut blanks to the chuck 163, the channel 146ᵃ in the guide 146 is preferably made somewhat larger than the greatest diameter of any nut to be passed therethrough so that the nuts will naturally assume superimposed positions in this channel with opposite flat faces extending horizontally, as shown in Figs. 17 and 21. If nuts having the usual hexagonal form are being fed through this guide, it is preferable to have them arranged in this manner with horizontal faces on each nut contacting with similar faces on adjacent nuts rather than to feed the nuts through a close fitting guide having two opposite faces of each nut extending vertically, since with the latter arrangement the nuts have vertically extending points engaging each other with a resulting tendency for the nuts to wedge in the guideway and interrupt the feed. Of course, when nuts of rectangular form are being tapped, each nut has parallel faces extending vertically and another pair extending horizontally and there is no tendency for this wedging action to take place. Assuming that nuts of the hexagonal form are to be tapped and that they are fed according to the preferred form, that is, with two opposite faces of each nut blank extending horizontally as it passes through the channel 146ᵃ of the feed member 146, an arrangement is preferably made for turning the nut blanks around their own axes as they enter the channel 163ᵃ of the chuck 163 so that each nut blank then has two opposite faces extending vertically and fitting between the side walls of the channel.

The fit of each nut blank in the channel 163ᵃ is made reasonably tight, without interfering with the free movement of the nut blank, in order that the blank will be closely held during the operation of tapping. This turning of the nut blanks around their own axes as they enter the chuck 163 is shown particularly in Fig. 21, where the channel 163ᵃ in the chuck is shown as being narrower than the channel or guide 146ᵃ in the feed member 146. At one side of the channel 163ᵃ, its wall terminates at its upper end in a shoulder 163ᵉ which projects inwardly beyond the adjacent vertically extending side wall of the channel 146ᵃ. At the other side of the channel 163ᵃ, the side wall of the channel is beveled as shown at 163ᶠ so that its upper edge terminates outwardly from the lower edge of the adjacent side wall of the channel 146ᵃ. With this construction, a nut blank 125, dropping through the channel 146ᵃ of the stationary feed member, with two of its opposite faces extending horizontally, engages with one of its inclined faces 125ᶜ upon the shoulder 163ᵉ while at the same time the opposite point of the nut passes freely past the beveled surface 163ᶠ. This momentary retardation of one side of the nut blank as it engages the chuck causes it to rotate through ninety degrees so that it then drops into the channel 163ᵃ with two of its opposite faces extending vertically and fitting between the side walls of the channel. If desired, the shoulder 163ᵉ may be formed upon a hard metal insert 182.

As the parts are illustrated in Fig. 12, the pin 168 on the end of the slide bar 165, which carries the nut chuck, is in engagement with the portion 170ᵃ of the cam surface, which has a small radius and which thus permits the nut chuck to occupy its extreme lower position under the influence of the springs 167, shown in Fig. 18. At this time, the upper end of the channel 163ᵃ of the chuck is in registry with the channel 146ᵃ of the feed member and it is during this time that a new nut blank drops from the channel 146ᵃ into the chuck, the locking plate 173 then being displaced from its nut blank gripping position due to the engagement of the pin 174 with the stop plate 180, as shown in Fig. 12. The nut 125ᵇ which has just been tapped drops to engagement with the stop bracket 177 at this time and the new untapped nut blank 125ᵃ moves into position in alignment with the tap 90. In order to insure the uninterrupted operation of the apparatus and to avoid feeding a new nut blank through too great a distance, the machine is preferably so adjusted at the beginning of its operation that one nut blank 125 will always be in the channel 163ᵃ above the untapped nut blank 125 which is located opposite the tap, so that after one nut blank is tapped and drops downwardly, the next untapped nut blank need drop only the width of one nut in order to come into the tapping position. At the time that this feeding of the nut blank occurs, the trip lever 155 is held in its retracted position by the engagement of the surface 163ᵇ of the chuck with the pin 164 on the lower end of the lever and the pin 150 has moved into engagement with the aperture of the lowermost nut blank in the channel 146ᵃ so that the column of nuts in the feed guide is thus supported without exerting any pressure upon the nut blanks which occupy the channel of the chuck.

As the cam 170 continues its rotation in the direction indicated by the arrow 184, the pin 168 begins to ride up on the shoulder 170^b at one end of the portion 170^a of the cam surface. This moves the chuck 163 sufficiently to cause the ends of the pins 174 to be free of engagement with the stop plate 180 so that the springs 176 mounted in the chuck are permitted to effect the movement of the locking plate 173 downwardly and toward the right until it engages and holds the nut blank which is positioned in alignment with the tap 90, as shown in Fig. 14. After the pin 168 has passed over the shoulder 170, it rides over the portion 170^c of the cam surface, which has a gradually increasing radius and which is of sufficient length to move the chuck a distance slightly greater than the thickness of the nut blank so that during this movement, the rotating tap 90 passes through the aperture of the nut and completely forms the desired threads therein. During this operation of tapping the nut, the tap spindle 88 is directly driven from the shaft 73 through the outer driving shell 98 and the friction clutch member 102, since the initial endwise pressure of the nut blank on the end of the tap will force the tap spindle 88 longitudinally of its axis until the surface 102^b of the clutch member engages the surface 98^b of the outer driving shell. When the tapping of the nut blank is completed, the relative positions of the tap, chuck and feed member are as illustrated in Fig. 15, where the tap 90 is shown projecting slightly through the tapped nut and the previously tapped nut 125^b has dropped onto the inclined nut table 178, along which it slides by gravity down into the pan 39. At this time, the chuck 163 has moved out of engagement with the pin 164 at the lower end of the trip lever 155 so that the springs 159 have operated to move the trip lever to the position shown in Fig. 15, wherein the pin 160 underlies and supports the column of nuts.

At the conclusion of the operation of tapping, with the parts in the relative positions shown in Fig. 15, the pin 168 will be at the end of the portion 170^c of the surface of the cam 170. The reverse movement of the chuck 163 then begins as the cam continues its rotation and the pin 168 rides over the portion 170^d of the cam surface. During this reverse movement, the chuck 163 is moved by the springs 167 and as soon as this reverse movement begins, the endwise pull upon the tap 90 serves to cause a sufficient longitudinal movement of the tap spindle 88 to disengage the clutch member 102 from the surface 98^b of the outer driving shell and to bring the surface 102^c of the clutch member into engagement with the reverse driving shell 105. The direction of rotation of the tap 90 is thus automatically reversed so that as the reverse movement of the chuck 163 takes place, the tap 90 turns in a direction adapted to withdraw it from the tapped nut. When the tap has been completely withdrawn from the nut, the pin 168 will have reached the end of its engagement with the portion 170^d of the surface of the cam 170 and it then moves rapidly over the shoulder 170^e of the cam surface into engagement with the portion 170^a of small radius. As the pin 168 passes over the shoulder 170^e, the surface 163^b of the chuck engages the pin 164 and moves the trip lever 155 to the position shown in Fig. 12, thereby releasing the lowermost nut in the column, which has previously been held by the pin 160, and at the same time moving the pin 150 into engagement with the next higher nut so that the column of nuts is then supported by the pin 150.

The cam 170 which actuates the nut holding chuck 163 is driven by suitable mechanism carried by the frame 50 and operated by the main driving shaft 46, as shown particularly in Figs. 2, 6 and 11. Since it is desirable to change the cam 170 for each size of nut to be tapped, in order to obtain the highest degree of efficiency and accuracy during the tapping operation, this cam is detachably mounted upon the end of a cam shaft 190 having a reduced extremity 190^a engaging the axial hole in the cam and having a threaded portion to receive the nut 191 by which the cam is held in place. The shaft 190 has an enlarged portion 190^b against which the inner face of the cam seats and the cam is accurately positioned and held against rotation with respect to the shaft by means of a pin 192 which passes through the cam into a recess formed in this enlarged portion 190^b of the shaft. Adjacent the portion 190^b, the shaft 190 has a bearing portion 190^c which is journaled in a bushing 193 mounted in a bearing hub formed in one of the side arms of the frame 50. A collar 194 is secured on the shaft 190 at the inner end of the bearing portion 190^c so that the shaft is held against endwise movement. The inner reduced portion of the cam shaft 190 is journaled in a bushing 195 which is secured within the bore of a hollow clutch drive shaft 196. This clutch drive shaft is in turn journaled in a bushing 197 secured in a bearing hub formed in the other arm of the frame 50. The clutch drive shaft 196 is actuated as hereinafter described and it is provided at its inner end with clutch teeth 196^a which are adapted to mesh with clutch teeth 198^a formed upon a clutch member 198 splined upon the shaft 190. The inner end of the clutch driving shaft 196 and the adjacent part of the clutch member 198 are provided with internal annular recesses in which is mounted a coil spring 199 adapted to disengage the clutch teeth 196^a and 198^a. The clutch member 198 is provided with an annular groove 198^b which is engaged by the shifter pins 200 mounted on the opposite arms of a shifter fork 202 secured on the shaft 203 which is journaled in a bearing formed in the end plate 50^a of the frame 50, as shown in Fig. 11. On the outer end of this shaft, there is secured a clutch shifting lever 205 which is shown particularly in Fig. 7. This lever is adapted to be moved angularly for the purpose of moving the clutch member 198 into engagement with the clutch teeth on the end of the clutch driving shaft and it is adapted to be secured in a position corresponding to the engagement of the clutch teeth by a spring clip 206 attached to the end of the housing 45, as shown in Figs. 7 and 9, and having a depression 206^a which engages and holds the lever 205 when it is in the clutch engaging position. When the lever is released from this depression, the clutch member is disengaged from the clutch driving shaft by the action of the spring 199.

The clutch driving shaft 196 is driven from a worm shaft 207 by means of a pair of change gears 208 and 209 which are detachably mounted upon the shafts 196 and 207, respectively. The gear 208 is splined upon the reduced extremity 196^b of the clutch driving shaft and is held thereon by a nut 210. The other change gear 209 is splined upon the reduced extremity 207^b of the worm shaft and is held thereon by a nut 211. It is necessary to change these gears 208 and 209 in order to obtain the proper speed and time relation of the cam 170 with each size of nut being tapped and the housing 45 is therefore provided with a removable cover plate 212 to permit convenient access to these gears. The worm shaft 207 is journaled in bushings 213 which are mounted in bearing hubs formed in the opposite arms of the frame 50, as shown particularly in Fig. 6. The worm shaft 207 has a worm wheel 214 secured upon the intermediate portion thereof and this worm wheel is driven by the previously described worm 55 secured upon the main driving shaft 46. At one side of the worm wheel 214, there is mounted the star-shaped cam 215 which serves to oscillate the arm 138 of the nut feeding mechanism through the plunger 140 previously described.

It will be apparent that by changing the gears 208 and 209, or by changing the pulleys 57 and 60, or by changing the speed of the driving motor 30, or by combining any or all of these changes, the cam 170 may be caused to rotate with the proper speed for tapping any desired size or form of nut. In conjunction with these possible changes in the driving mechanism for altering the speed of rotation of the cam, the operator may interchange the cam 170 with another cam particularly adapted for producing the proper time relation of the different movements of the nut holding chuck during the operation of tapping and releasing the nut from the chuck. The chuck 163, the feed guide 146 and other parts of the nut feeding mechanism are removable and interchangeable so that the machine may be readily adapted to use with nut blanks of different sizes. The construction and arrangement of the nut blank feeding mechanism is such that nut blanks of various forms, including grooved or castellated nut blanks, may be fed therethrough in indiscriminate fashion without giving attention to the direction in which the castellations of the blanks are faced and without interfering with the accuracy with which the blanks are tapped when they are positioned in the nut holding chuck. As the nut blanks are fed successively to the chuck 163 in the manner previously described, they are accurately positioned and held with sufficient firmness to permit them to be accurately tapped by the rotating tap 90 which is also firmly supported so that it has a definite path of travel along its own axis. As the nut chuck 163 moves upwardly along its guide under the influence of the cam 170, the tap head 75 may yield with a corresponding compression of the spring 85, in the event that the material of the nut blank is of unusual hardness, for example, so that the tap 90 does not pass readily therethrough. If a nut blank 125 is not properly aligned in the nut chuck 163 with its aperture in proper position with respect to the axis of the tap, the end of the tap will merely engage the surface of the nut blank and the entire tap head 75 will move toward the left, as viewed in Fig. 2, thereby permitting the chuck 163 to conclude its cycle of movements under the influence of the cam 170 while at the same time preventing the breaking of the tap 90. When the nut chuck 163 is returned to its lower position after such a movement of the tap head 75 along its guideway, the tap head is returned to its normal position by the spring 85 and is arrested by the slightly resilient stop spring 84, thus automatically locating the extremity of the tap 90 in proper position to engage and thread a nut blank upon the next upward movement of the nut holding chuck. This yielding drive of the tap spindle is a feature of great importance in preventing damage to the machine and, particularly, in preventing the breakage of the taps. If the tap 90 is broken for any reason, the resiliently mounted locking plate 173 automatically engages and holds a nut blank in the chuck with sufficient pressure to retain a column of nuts in the channels above so that even though the machine continues to operate with a broken tap, the feeding of a series of untapped blanks into the pan 39, where they would become mingled with the tapped nuts, is automatically prevented.

During the operation of tapping a nut blank by the use of the present invention, the blank is held rigidly by parts which engage two opposite faces of the blank and also by parts which engage its end surfaces, and the tap is also rigidly held against movement laterally. These are important features contributing to the accuracy of the threads in the finished nuts. Although the holding of the opposite side faces of the nut blank may sometimes be sufficient for the production of nuts of the lower classes of accuracy, it is found that the additional holding of the ends of the blank is very important when nuts having the class 3 or class 4 degrees of accuracy are to be produced. Even when castellated nuts are being tapped, accurate threads are formed without breakage of taps whether the castellations are directed toward the tap or in the opposite direction, and the castellated blanks may be fed to the chuck indiscriminately without regard to the direction in which the castellations are faced. In addition to the improvement in accuracy, as compared with other methods of tapping, the present invention is adapted to effect the tapping of nuts with much greater speed than has heretofore been possible. With the use of prior machines and methods, the maximum surface speed of the rotating tap has been only about thirty feet per minute but with the present invention surface speeds of one hundred and twenty to one hundred and forty feet per minute may be maintained without injury to the tap and without destroying the uniform accuracy of the tapped nuts. As a result of the improved speed of operation, arising partly from the speed of rotation of the tap during the tapping of the blanks and partly from the fact that the tap is rotated at a much higher speed while it is being withdrawn from the tapped nut, the output of a machine embodying the present invention is very much greater than that of any prior machine, such as a machine employing a bent shank tap. For example, while a machine of the latter type may have a maximum output of eighteen hundred nuts per hour, a machine embodying the present invention can produce nuts of the same size and description and of greater accuracy at the rate of three thousand per hour. The gear ratio of the tap head is preferably such that the tap has a speed of reversal during its withdrawal from the tapped nut amounting to twice its speed of rotation during the tapping operation. For example, if the tap has a speed of 1500 R. P. M. during its advance, it is reversed and withdrawn at a speed of 3000 R. P. M. The quick reversal of the tap at the conclusion of the operation of tapping a nut blank has the salutary effect of causing the metal chips to be ejected from the flutes of the tap so that they do not interfere with the withdrawal of the tap from the nut.

Apart from the matters of speed and accuracy, the improvements herein described are of great advantage in reducing the cost of tapping by substantially eliminating the breakage of taps, so that the life of a tap in the machine of the present invention is substantially three times as great as the life of a tap of the bent shank type. While the average output of a single tap of the bent shank type is only fifteen thousand nuts, it has been found that a straight shank tap employed in the machine of the present invention may have an output during its life of from one hundred twenty thousand to two hundred thousand nuts. The fact that the tap comes to rest at the end of the tapping operation, and is momentarily stationary before beginning its reverse movement, is an important factor in contributing to the elimination of breakage and enables blind nuts to be tapped without danger of accident. Besides this saving in taps, there is a great saving in the cost of tapping due to the fact that less labor is required because one workman may operate several machines of the present invention, and due to the reduced idle time of the machine caused by adjustments and changes of taps. Another great saving, as compared with prior practices, arises from the fact that the use of the machine and improved method of the present invention greatly reduces or substantially eliminates inspection because nuts of a uniform high degree of accuracy may be produced with certainty, whereas according to prior methods it has been necessary to inspect and sort all the nuts produced, particularly when even a moderate degree of uniformity and accuracy was desired.

Although one form of the invention has been shown and described in connection with one example of the improved method of tapping by way of illustration, it will be understood that it may be constructed in various other embodiments coming within the scope of the appended claims.

I claim:

1. The combination in a nut tapping machine, of a rotatable tap, a chuck slidably mounted for movement longitudinally of said tap and having an upwardly extending channel to receive nuts, locking means carried by said chuck for holding a nut in said channel in alignment with said tap, means for moving said chuck longitudinally of said tap and then withdrawing said chuck, means actuated in the retracted position of said chuck for releasing said nut from said locking means, and stationary means mounted adjacent said chuck for retaining said released nut in said channel until said chuck reaches a predetermined position by relative movement with respect to said stationary means.

2. The combination in a nut tapping machine, of a rotatable tap, a chuck slidably mounted for movement longitudinally of said tap and having an upwardly extending channel to receive nuts, locking means carried by said chuck for holding a nut in said channel in alignment with said tap, means for moving said chuck longitudinally of said tap and then withdrawing said chuck, means actuated in the retracted position of said chuck for releasing said nut from said locking means, stationary means mounted adjacent said chuck for retaining said released nut in said channel until said chuck reaches a predetermined position by relative movement with respect to said stationary means, a nut receiving receptacle, and means for conveying said nut to said receptacle after it has been released by said last named means.

3. The combination in a nut tapping machine, of a rotatably mounted tap, a nut holding chuck slidably mounted for movement longitudinally of said tap and having a nut receiving channel therein, a locking plate slidably mounted on said chuck for holding a nut in said channel in alignment with said tap, resilient means for holding said locking plate in nut-engaging position, means for advancing said chuck longitudinally of said tap and then retracting said chuck, means operated when said chuck is in its retracted position for actuating said locking plate to release said nut, and a stationary member mounted adjacent said chuck for engaging said released nut and causing it to position the next succeeding nut in alignment with said tap, said member being adapted to permit the discharge of said released nut from said channel when said chuck reaches a predetermined position by relative movement with respect to said stationary means.

4. The combination in a nut tapping machine, of a rotatably mounted tap, a chuck having a channel adapted to receive a nut and hold it in alignment with said tap, means for moving said chuck longitudinally of said tap and then withdrawing said chuck, nut feeding means comprising a member having a nut guide therein, and nut tripping means actuated by said chuck for automatically discharging a nut from said guide each time that said chuck is retracted to a position beneath said guide.

5. The combination in a nut tapping machine, of a rotatably mounted tap, a chuck having a channel adapted to receive a nut and hold it in alignment with said tap, means for moving said chuck longitudinally of said tap and then withdrawing said chuck, nut feeding means comprising a member having a nut guide therein, a trip lever pivotally mounted adjacent said guide, a pair of pins carried by said lever, one of said pins being adapted to engage a nut in said guide when said lever is in one extreme position and the other of said pins being adapted to engage a nut in said guide when said lever is in another extreme position, and means actuated by said nut chuck for moving said trip lever from one position to the other.

6. The combination in a nut tapping machine, of a rotatably mounted tap, a nut holding chuck movable longitudinally of said tap, means for advancing said chuck and then retracting it, an upwardly extending guide member adapted to feed nuts to said chuck and having a nut conveying groove therein, a trip lever mounted on said guide member, said chuck being adapted to move said trip lever in one direction when it reaches a predetermined position, resilient means for moving said lever in the opposite direction, and a pair of pins carried by said trip lever and adapted to intersect said groove alternately in successive extreme positions of said trip lever.

7. The combination in a nut tapping machine, of a tap, a tap spindle having said tap rigidly mounted therein, a tap driving shaft, a power transmitting and reversing unit connected between said shaft and said spindle, means for holding a nut and moving it into engagement with said tap, and means for permitting movement of said unit and said spindle when pressure is exerted on said tap by said nut.

8. The combination in a nut tapping machine, of a tap spindle, a tap rigidly mounted on said spindle, a tap drive shaft, a power transmitting and reversing unit interposed between said shaft and said spindle, said spindle being adapted by relative longitudinal movement with respect to said unit to effect the reversal of the direction of rotation of said spindle, means for holding a nut in alignment with said tap, means for moving said nut holding means in the opposite direction longitudinally of said tap, a support in which said power transmitting unit is slidably mounted, and resilient means tending to move said unit toward said nut holding means.

9. The combination in a nut tapping machine, of a tap spindle, a tap rigidly mounted on said spindle, a tap drive shaft, a power transmitting and reversing unit interposed between said shaft and said spindle, said spindle being adapted by relative longitudinal movement with respect to said unit to effect the reversal of the direction of movement of said rotation, means for holding a nut in alignment with said tap, means for moving said nut holding means in the opposite direction longitudinally of said tap, a support in which said power transmitting unit is slidably mounted, resilient means tending to move said unit toward said nut holding means, and means for supporting said power-transmitting unit and said spindle with the axis of said spindle and said tap inclined downwardly toward said nut holding means.

10. The combination in a nut tapping machine, of a tap spindle, a tap carried rigidly by said spindle, a spindle driving shaft, a friction driving unit connected between said shaft and said spindle, means for mounting said unit for movement longitudinally of said shaft, means for moving a nut and holding it in engagement with said tap, and resilient means opposing the movement of said unit by the force transmitted thereto from said nut.

11. The combination in a nut tapping machine, of a tap spindle, a tap carried rigidly by said spindle, a spindle driving shaft, a friction driving unit connected between said shaft and said spindle, means for mounting said unit for movement longitudinally of said shaft, means for moving a nut and holding it in engagement with said tap, resilient means opposing the movement of said unit by the force transmitted thereto from said nut, and a slightly resilient stop for locating said unit in its normal position.

12. The combination in a nut tapping machine, of a spindle driving shaft mounted in an inclined position, a power transmitting and reversing slidably mounted for movement longitudinally of the axis of said shaft, a tap spindle mounted on and actuated by said unit with its axis in an inclined position, a stop for determining the lower position of said unit, and resilient means tending to move said unit toward said stop.

13. The combination in a nut tapping machine, of a spindle driving shaft mounted in an inclined position, a power transmitting and reversing unit slidably mounted for movement longitudinally of the axis of said shaft, a tap spindle mounted on and actuated by said unit with its axis in an inclined position, a stop for determining the lower position of said unit, resilient means tending to move said unit toward said stop, a tap carried by said spindle, and a nut holding chuck movable longitudinally of said tap.

14. The combination in a nut tapping machine, of a spindle driving shaft mounted in an inclined position, a power transmitting and reversing unit slidably mounted for movement longitudinally of the axis of said shaft, a tap spindle mounted on and actuated by said unit with its axis in an inclined position, a stop for determining the lower position of said unit, resilient means tending to move said unit toward said stop, a tap carried by said spindle, a nut holding chuck movable longitudinally of said tap, a cam for moving said chuck toward said spindle, and resilient means tending to move said chuck away from said spindle.

15. The combination in a nut tapping machine, of a rotatably mounted tap, a chuck having a channel adapted to receive a nut and hold it in alignment with said tap, said channel being of substantially the same width as the distance between opposite flat sides of said nut, nut feeding means having a guide adapted to convey hexagonal nuts positioned with flat sides of adjacent nuts contacting with each other, and means for transferring said nuts from said guide to said channel and turning said nuts whereby they are positioned in said channel with parallel flat sides engaging opposite side walls of the channel.

16. The combination in a nut tapping machine, of a rotatably mounted tap, a chuck having a channel adapted to receive a nut and hold it in alignment with said tap, said channel being of a width to be fitted by opposite parallel side faces of said nut feeding means comprising a vertically extending guide of such width as to convey a series of hexagonal nuts each positioned with two of its apices engaging opposite side walls of the guide, means for effecting the discharge of said nuts from said guide to the channel of said chuck, and means for turning each of said nuts about its own axis as it enters said chuck whereby said nuts are positioned in the channel of said chuck with flat sides engaging the sides of said channel and with opposite apices engaging the apices of adjacent nuts.

17. The combination in a nut tapping machine, of a rotatably mounted tap, a chuck having a channel adapted to receive a nut and hold it in alignment with said tap, said channel being of such width as to be fitted by opposite parallel side faces of said nut feeding means comprising a vertically extending guide of such width as to convey a series of hexagonal nuts each positioned with two of its apices engaging opposite side walls of the guide, and means for effecting the discharge of said nuts from said guide to the channel of said chuck, said chuck having a shoulder at the entrance of said channel adapted to engage a side face of each nut as it enters said channel to turn said nut about its own axis and position it in said channel with two flat sides engaging the side walls of said channel.

18. The combination in a nut tapping machine, of a tap spindle, a tap rigidly mounted in said spindle, a tap drive shaft, a power transmitting and reversing unit occupying a normal stationary position and connected to drive said spindle from said shaft, said spindle being adapted by relative longitudinal movement with respect to said unit to reverse the direction of rotation of said spindle, means for rigidly holding a nut in alignment with said tap, means for effecting a positive non-yielding movement of said holding means toward said tap, and means for permitting a limited cushioned movement of said unit under the influence of the pressure applied to said tap by said holding means.

HERMAN GOLDBERG.

CERTIFICATE OF CORRECTION.

Patent No. 2,067,267.  January 12, 1937.

HERMAN GOLDBERG.

It is hereby certified that error appears in the printed specification of the above numbered patent requiring correction as follows: Page 10, first column, line 50, claim 12, after the word "reversing" insert unit; and that the said Letters Patent should be read with this correction therein that the same may conform to the record of the case in the Patent Office.

Signed and sealed this 2nd day of March, A. D. 1937.

(Seal)

Henry Van Arsdale
Acting Commissioner of Patents.